United States Patent
Yamagishi

(10) Patent No.: US 7,153,210 B2
(45) Date of Patent: Dec. 26, 2006

(54) MOBILE COMMUNICATION TERMINAL AND MANAGEMENT APPARATUS

(76) Inventor: Junichi Yamagishi, c/o Unirec Co., Ltd., 6-3, 2-Chome, Kaminarimon, Taito-ku, Tokyo (JP) 111-0034

( * ) Notice: Subject to any disclaimer, the term of this patent is extended or adjusted under 35 U.S.C. 154(b) by 453 days.

(21) Appl. No.: 10/094,252

(22) Filed: Mar. 8, 2002

(65) Prior Publication Data

US 2004/0203588 A1    Oct. 14, 2004

(51) Int. Cl.
*A63F 13/00* (2006.01)
(52) U.S. Cl. .......................... 463/39; 463/42
(58) Field of Classification Search ............ 463/29–30, 463/36–43
See application file for complete search history.

(56) References Cited

U.S. PATENT DOCUMENTS

| 6,846,238 B1 * | 1/2005 | Wells | ............... 463/39 |
| 2004/0128241 A1 * | 7/2004 | Akama | ............... 705/39 |

FOREIGN PATENT DOCUMENTS

| JP | 5-146555 | 6/1993 |
| JP | 6-152773 | 5/1994 |
| JP | 7-171240 | 7/1995 |
| JP | 8-249530 | 9/1996 |
| JP | 9-298588 | 11/1997 |

\* cited by examiner

*Primary Examiner*—Kim Nguyen
(74) *Attorney, Agent, or Firm*—Jordan and Hamburg LLP

(57) ABSTRACT

The management apparatus comprises a mobile communication terminal comprising a radio unit (22) for enabling to wirelessly output a signal and a reading unit (22) for enabling to read an identification sign, a playing section (1) capable of being played based on personal information, an input section (19) provided on the playing section (1) to input personal information with a radio signal from the mobile communication terminal (21), an externally readable unique identification sign (24) provided on the playing section (1) to identify the playing section (1), and a control section (5) for calling an information service center (28) based on a radio signal input of the personal information through the radio unit (22) of the mobile communication terminal (21) and a reading of an identification sign through the identification unit (22) and for enabling to play by the playing section (1), wherein the information service center (28) performs accounting according to a playing of the playing section (1).

6 Claims, 8 Drawing Sheets

MOBILE COMMUNICATION TERMINAL AND MANAGEMENT APPARATUS

BACKGROUND OF THE INVENTION

1. Field of the Invention

The present invention relates to a mobile communication terminal and a management apparatus using the same.

2. Description of the Prior Art

Conventionally, when a playing is conducted in a game device and the like in an amusement arcade, a player can play by slotting a coin such as a 25-cent coin. In such a game device, in order to conduct playing a plurality of times, the player needs a plurality of 25-cent coins and it is inconvenient that the player always has some coins, and further it is inconvenient that the player conducts the games while changing coins on the money changer.

On the contrary to this, recently, as described in Japanese Patent Application Laid-Open Nos. 5-14655 and 7-171240, there can be configured such that a prepaid card, a membership card or credit card is used to play games without having coins.

Recently, a development of a mobile communication terminal such as a portable phone and a development of the Internet are remarkable so that it is desired to further enhance the versatility thereof and to sufficiently enjoy playing with a simple management.

SUMMARY OF THE INVENTION

It is an object of the present invention to provide a mobile communication terminal capable of further enhancing the versatility and a management apparatus using the same.

A first aspect of the present invention provides a mobile communication terminal, comprising a radio unit for enabling to wirelessly output a signal such as personal information and a reading unit for enabling to read an identification sign.

A second aspect of the present invention provides a management apparatus, comprising a mobile communication terminal comprising a radio unit for enabling to wirelessly output a signal such as personal information and a reading unit for enabling to read an identification sign, an operation object capable of being operated on the basis of personal information, an input section which is provided on the operation object to input personal information from the mobile communication terminal with a radio signal, an externally readable unique identification sign which is provided on the operation object to identify the operation object, and a control section for calling an accounting center on the basis of a radio signal input of personal information through a radio unit of the mobile communication terminal and a reading of the identification sign through an identification unit and for enabling to operate with the operation object on the basis of the calling, wherein the accounting center performs accounting according to an operation of the operation object.

A third aspect of the present invention provides a management apparatus, comprising a mobile communication terminal comprising a radio unit for enabling to wirelessly output a signal such as personal information and a reading unit for enabling to read an identification sign, a playing section capable of storing playing information to play on the basis of personal information, an input section which is provided on the playing section to input personal information from the mobile communication terminal with a radio signal, an externally readable unique identification sign which is provided on the playing section to identify the playing section, and a control section for calling an information service center on the basis of a radio signal input of personal information through the radio unit of the mobile communication terminal and a reading of the identification sign through the identification unit and for enabling to play with the playing section on the basis of the calling, wherein the information service center performs accounting according to a playing of the playing section.

A fourth aspect of the present invention provides the management apparatus according to the third aspect, wherein the information service center stores newly arrived information of playing information to transmit the newly arrived information according to the calling, and that the control section receives the newly arrived information to output it to the playing section.

A fifth aspect of the present invention provides the management apparatus according to any one of the second to fourth aspects, further comprising a password input section for inputting a password as personal information, wherein the control section calls the information service center when the input password corresponds to personal information.

A sixth aspect of the present invention provides a management apparatus comprises a mobile communication terminal, comprising a radio unit for enabling to wirelessly output a signal such as personal information and a reading unit for enabling to read an identification sign and is capable of being connected via the Internet, a plurality of operation objects capable of being operated on the basis of personal information, an input section which is provided on the operation object to input personal information from the mobile communication terminal with a radio signal, an externally readable unique identification sign which is provided on the operation object to identify the operation object, and a control section for calling an Internet provider on the basis of a radio signal input of personal information through the mobile communication terminal and a reading of the identification sign through an identification unit and for enabling an operation of the operation object on the basis of the calling, wherein the Internet provider performs accounting according to an operation of the operation object.

A seventh aspect of the present invention provides a management apparatus, comprising a mobile communication terminal which comprises a radio unit for enabling to wirelessly output a signal such as personal information and a reading unit for enabling to read an identification sign and is capable of being connected via the Internet, and a plurality of information handsets each of which comprises an externally readable unique identification sign and is capable of operating Internet information on the basis of personal information, and which calls an Internet provider on the basis of a radio signal input of personal information through a radio unit of the mobile communication terminal and a reading of the identification sign through an identification unit and enables to operate the Internet information on the basis of the calling, wherein the Internet provider performs accounting according to an operation of the information handsets.

According to the first aspect of the present invention, for example, in the case of a system where a control section calls an accounting center on the basis of an input of personal information through a mobile communication terminal and a reading of an identification sign and enables an operation of an operation object on the basis of the calling so that the accounting center performs accounting according to the operation of the operation object, an operator can input personal information with a radio signal from a radio unit of the mobile communication terminal to an input section and cause a reading unit to read a unique identification sign of the operation object which is to be operated. Therefore, the operator can proceed to the operation of the operation object only with the operation of the mobile communication terminal. Further, the reading unit is caused to read the menus of a product displayed with the identification signs so that an application such as an order of the product can be conducted. Therefore, it is possible to simplify the key operation of the mobile communication terminal and to remarkably improve the versatility thereof.

According to the second aspect of the present invention, when the operator inputs the personal information with a radio signal into the input section from the radio unit of the mobile communication terminal and causes the reading unit to read the unique identification sign of the operation object to be operated, the control section calls the accounting center on the basis of the input of the personal information through the mobile communication terminal and the reading of the identification sign, and enables the operation of the operation object on the basis of the calling. Therefore, the operator can operate the operation object only by operating the mobile communication terminal, and is released from an inconvenience of using coins. The accounting center can accurately perform accounting according to the operation of the operation object. Further, it is possible to enhance a degree of freedom of an accounting setting.

According to the third aspect of the present invention, when the player inputs the personal information with a radio signal into the input section from the radio unit of the mobile communication terminal and causes the reading unit to read the unique identification sign of the playing section, the control section calls an information service center on the basis of the input of personal information through the mobile communication terminal and the reading of the identification sign and enables a playing with the playing section on the basis of the calling. Therefore, the player can play with the playing section only by operating the mobile communication terminal and is released from the inconvenience of using coins so that the player can sufficiently enjoy the games and the like. The information service center can accurately perform accounting according to the playing. Further, it is possible to enhance the degree of freedom of the accounting setting.

According to the fourth of the present invention, in addition to the effect of the third aspect, the information service center transmits newly arrived information of the playing according to the calling, and the control section receives the newly arrived information to output it before the playing so that the information service center can provide the newly arrived information to the player.

According to the fifth aspect of the present invention, in addition to the effect of any one of the second to fourth aspects, it is configured so that a password is input as personal information, it is difficult for other persons than the owner of the mobile communication terminal to use the mobile communication terminal, thereby more proper accounting can be performed.

According to the sixth aspect of the present invention, when the operator inputs the personal information with a radio signal into the input section from the radio unit of the mobile communication terminal and causes the reading unit to read the unique identification sign of the operation object to be operated, the control section calls an Internet provider on the basis of the input of the personal information through the mobile communication terminal and the reading of the identification sign and enables the operation of the operation object on the basis of the calling. Therefore, the operator can operate the operation object only by operating the mobile communication terminal. The Internet provider can accurately accounting according to the operation of the operation object. Further, it is possible to enhance the degree of freedom of the accounting setting.

According to the seventh aspect of the present invention, when the operator inputs the personal information into the input section from the radio unit of the mobile communication terminal and causes the reading unit to read the unique identification sign of the operation object to be operated, the information handset calls an Internet provider on the basis of the input of the personal information and the reading of the identification sign and enables the operation of the Internet information on the basis of the calling. Therefore, the user can operate the Internet information through the information handset only by operating the mobile communication terminal and is released from the inconvenience of using coins so that the user can sufficiently enjoy the games and the like. The Internet provider can perform accounting according to the operation of the Internet information. Further, it is possible to enhance the degree of freedom of the accounting setting.

DETAILED DESCRIPTION OF THE PREFERRED EMBODIMENTS (First Embodiment)

Figure 1:
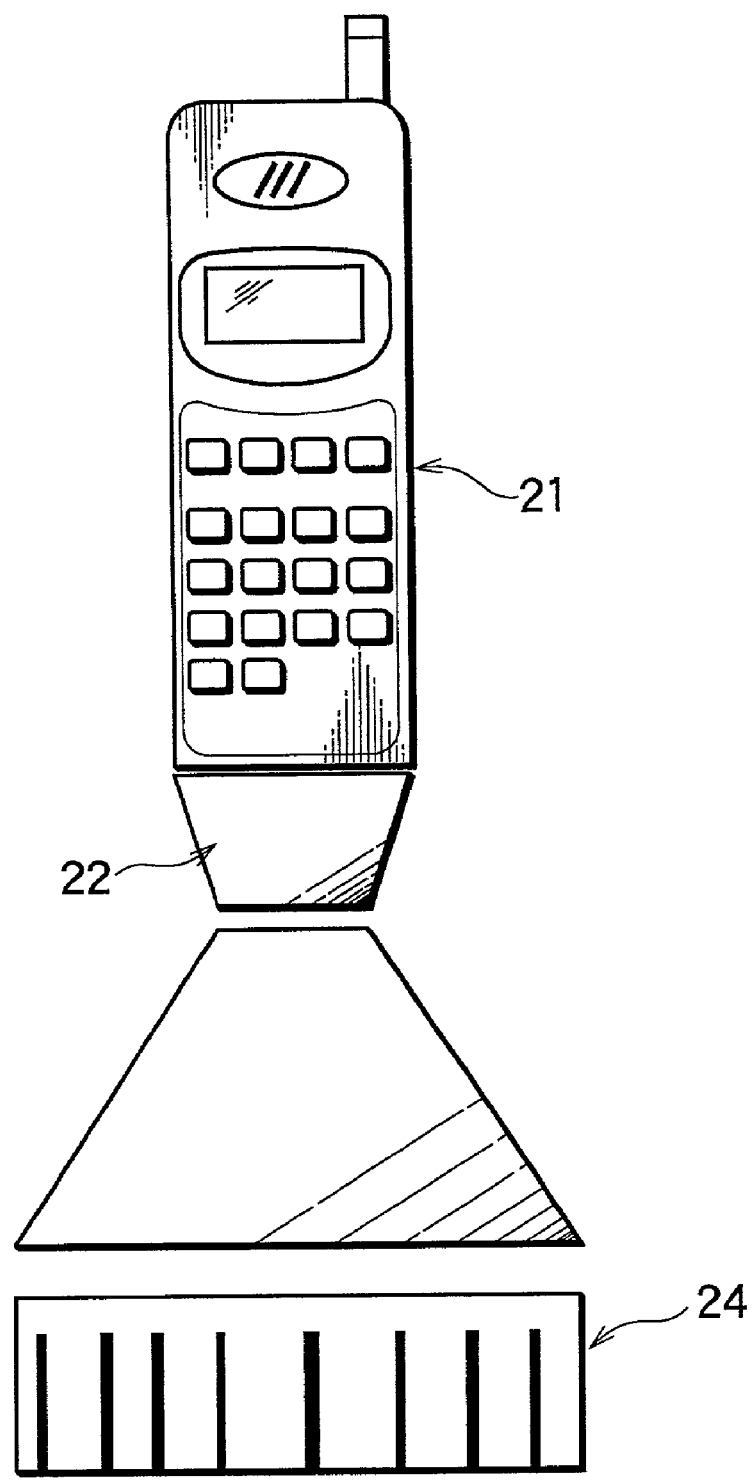
FIG. 1 is a front view showing a mobile communication terminal according to a first embodiment of the present invention.
Figure 2:
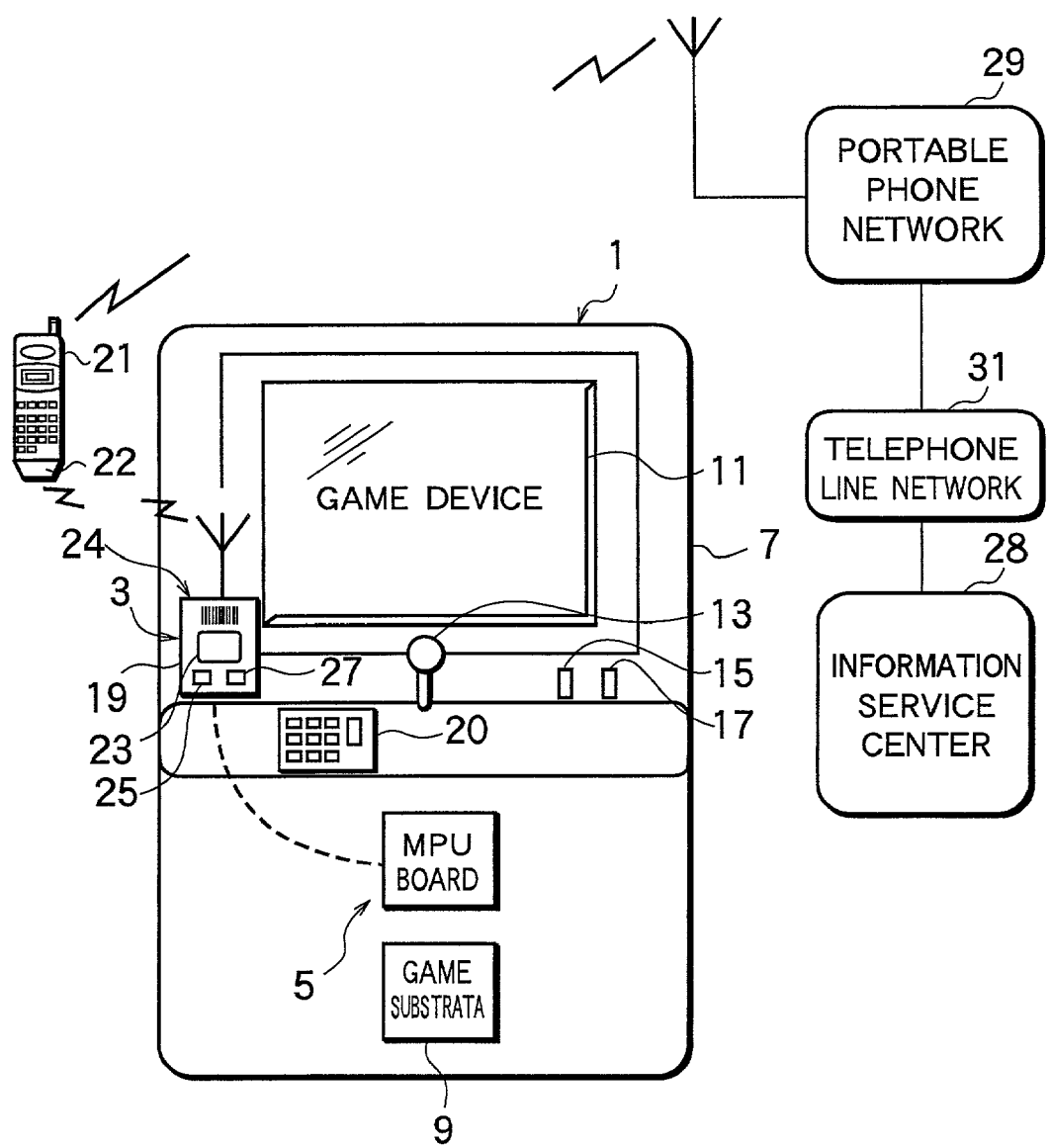
FIG. 2 is a block diagram according to the first embodiment of the present invention.

FIG. 1 shows a mobile communication terminal according to a first embodiment of the present invention, and FIG. 2 is a block diagram of a management apparatus using this mobile communication terminal.

At first, as shown in FIG. 1, a mobile communication terminal 21 comprises an attachment 22 in which a radio unit and a reading unit are integrated at a lower connecting port. Alternatively, a configuration can be employed in which the attachment 22 is integrated with the mobile communication terminal 21.

The radio unit of the attachment 22 is directed for enabling to wirelessly output a signal such as a signal including personal information or the like, and is a radio system of weak SS (split spectrum spreading) radio, which is becoming widespread as a BlueTooth. The reading unit of the attachment 22 is directed for enabling to read a bar code 24 as an externally readable identification sign, and is configured with a bar code scanner. A reading in this bar code scanner is performed in an optical reading range 26 by, for example, a lens spreading. However, if a full length of the bar code is within a size of the bar code scanner, the bar code can be read by directly attaching a tip end of the attachment 22 on the bar code.

In addition, the bar code 24 employs a RF tag also as an identification sign irrespective of the types such as a one-dimensional bar code, a two-dimensional bar code and the like, and the reading unit can be configured with a RF scanner.

As shown in FIG. 2, a management apparatus using the mobile communication terminal 21 comprises a playing section 1, an input section 3, and a control section 5. The playing section 1 is an operation object or a target to be operated, and a plurality of operation objects of the same type are provided in an amusement arcade. A game substrata 9 is provided in a housing 7 of the playing section 1 to store games as playing information. Further, a screen 11 for outputting the stored games in an output manner is provided in the housing 7, a player can enjoy a game while watching the screen 11 according to an operation of an operation knob 13 or the like. In addition, the operation object is not limited to the playing section 1, and is applicable to an automatic vending machine or the like of products such as beverages.

The coin slots 15 and 17 are provided in the housing 7 of the playing section 1. The coin slot 15 is a slot for, for example, 25-cent coins, it is possible to play one time of a game, for example, one time according to the slotting. The coin slot 17 is a slot for, for example, 1-dollar coins, it is possible to play four times of a game, for example, according to the slotting. A start of the game is performed with a control of a game credit switch described later.

Further, the numeric keypad 20 is provided as a password input section in the housing 7 of the playing section 1. A password input through the numeric keypad 20 is directed to be input to the control section 5. In addition, an input of the password can be performed in the mobile communication terminal 21. In this case, the numeric keypad 20 is not required, and the mobile communication terminal 21 functions as the password input section.

The input section 3 is directed for inputting personal information from the mobile communication terminal 21 with a radio signal, and is configured with a radio terminal device 19 fixed on the housing 7.

At an upper front portion of the radio terminal device 19, the bar code 24 which is a unique identification sign of the playing section 1 is provided. The bar code 24 differs according to a plurality of the playing sections 1, which enables to identify the respective playing sections 1 when a plurality of the playing sections 1 are provided.

At a middle front portion of the radio terminal device 19, a status display section 23 is provided, and at a lower portion thereof, the game start agreement buttons 25 and 27 are provided. One game start agreement button 25 corresponds to the coin slot 15, and is directed for agreeing with one time of game. The other game start agreement button 27 corresponds to the coin slot 17, and is directed for agreeing with, for example, four times of games. When a player wants to play a game twice, he/she can play the games by pressing the game start agreement button 25 again after the first game is terminated. Three times of games can be similarly performed. Further, he/she wants to play five times of games, he/she can play the games five times in total by pressing the game start agreement button 25 again after four times of games are terminated with the game start agreement button 27. Six times or more of games can be similarly performed. In addition, other types of buttons and other combinations can be employed. A configuration can be employed in which the game start agreement buttons 25 and 27 are replaced with the displays of identification signs of the bar codes and the like, which are caused to be read with the scanner of the mobile communication terminal 21 to identify the number of times of games.

The control section 5 is configured with a MPU board, and is directed for reading a subscription number which is input to the input section 3 with a radio signal from the mobile communication terminal 21, calling an information service center 28, and enabling to play with the playing section 1 at least unit times. A reading of subscription number and the like will be described later.

The information service center 28 is configured to reach a number corresponding to at least the number of unit times via a portable telephone network 29 as a mobile communication network, and a telephone line network 31 as a fixed communication network.

In the present embodiment, for example, a number corresponding to one time of game, and a number corresponding to four times of games are provided, when the number corresponding to one time of game is reached, a fee for one time of game is accounted, and when the number corresponding to four times of games is reached, a fee for four times of games is accounted. Therefore, the information service center configures an accounting center in the present embodiment.

Figure 3:
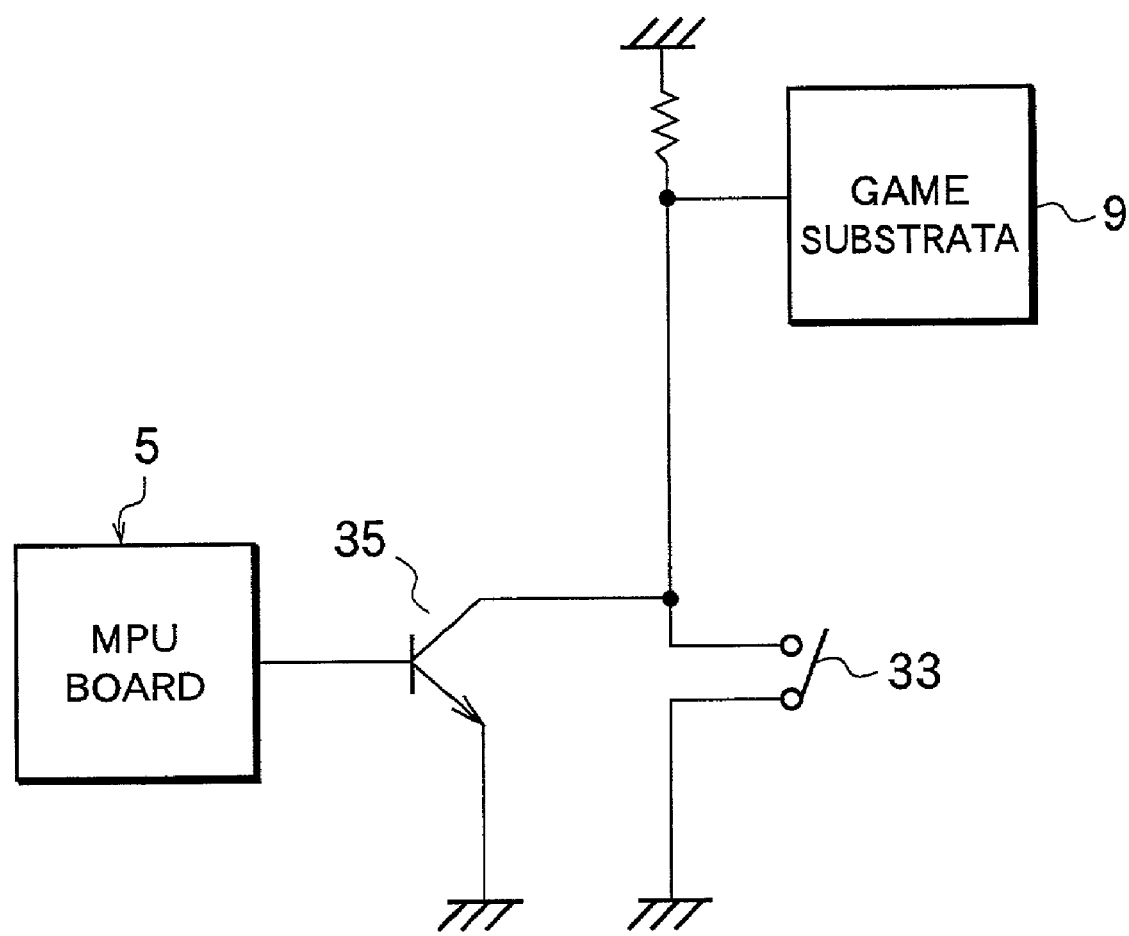
FIG. 3 is a circuit configuration diagram of a game start agreement switch according to the first embodiment.

FIG. 3 shows a circuit configuration of the game credit switches 33 and 35. The game credit switch 33 is a mechanical switch. For example, when a 25-cent coin is slotted from the coin slot 15, the switch turns on one time, when a 1-dollar coin is slotted from the coin slot 17, the switch turns on again after the first game is terminated and then the second game is started, the switch sequentially turns on four times.

The game credit switch 35 is configured with a transistor, and a gate thereof is connected to the MPU board 5. Therefore, when the game start agreement button 25 is pressed, a signal is transmitted one time from the MPU board 5 to the game credit switch button 35, and one time of game can be played according to a conductivity of the game credit switch 35. Further, when the game start agreement button 27 is pressed, the signals are sequentially transmitted four times from the MPU board 5, four times of games can be played.

Figure 4:
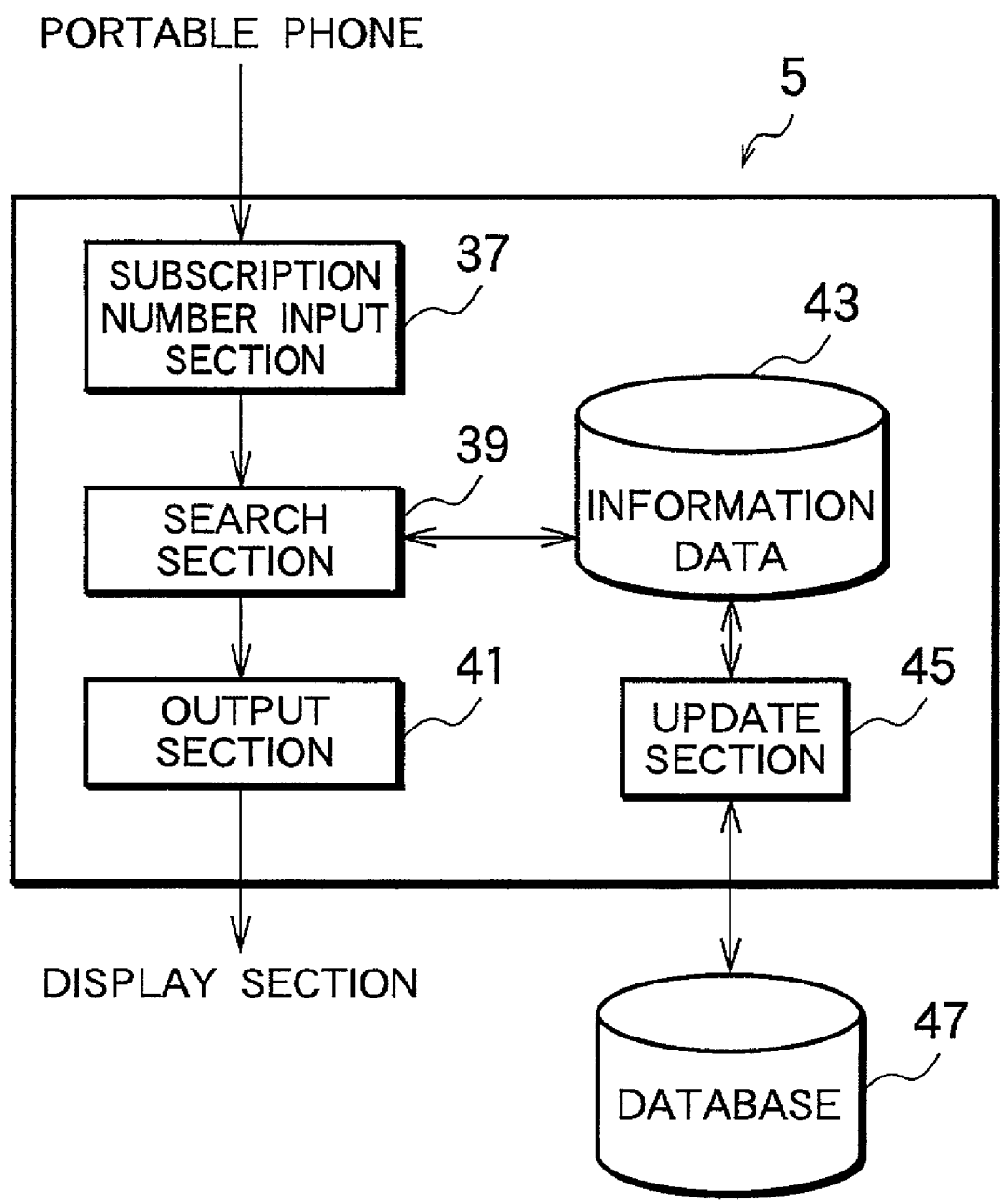
FIG. 4 is a block diagram of a control section according to the first embodiment.

FIG. 4 is a block diagram of a subscription number reading of the control section 5. The control section 5 comprises a telephone number input section 37, a search section 39, an output section 41, information data 43, and an update section 45.

The information data 43 has a subscription number, an address, a name and the like of a subscriber of the mobile communication terminal 21 stored therein. The information data 43 is configured to update information data from a database 47 with the update section 45. The database 47 is held by a provider of the portable telephone network 29, when a new subscriber is added or a subscription contract is stopped, information thereon is always held in the database 47. Therefore, the information data 43 can always hold the latest information data.

As shown in FIGS. 1 and 2, in the amusement arcade, when a player transmits a radio signal from the radio unit of the attachment 22 to the radio terminal device 19 through an operation of the mobile communication terminal 21, a serial communication is performed between the radio terminal device 19 and the control section 5, and the subscription number and the like are read. In other words, it means that personal information has been input into the input section 3.

With more explanation, as shown in FIG. 4, the telephone number input section 37 acquires the subscription number from the radio terminal device 19 (portable or mobile telephone), the acquired subscription number is input into the search section 39. In the search section 39, information of the information data 43 is searched according to the acquired subscription number, when data corresponding to the subscription number is found, the data is output to the output section 41.

An output is performed from the output section 41 to the status display section 23 of the radio terminal device 19, the subscription number, the subscriber's address, his/her name and the like are displayed on the status display section 23. The player confirms the status display section 23.

Then, through a control of the control section 5, a message such as "Input a password" is issued from a voice generation section, and then the player inputs the password through the numeric keypad 20. The input password is similarly confirmed in the control section 5 according to the information of the information data 43. If this password is not an owner's of the mobile communication terminal 21, a message such as "Password is wrong" is issued from the voice generation section. Therefore, the player can input the correct password.

Next, the player causes the bar code scanner of the attachment 22 to read the bar code 24. A reading result is stored in the mobile communication terminal 21. When the game start agreement button 25 or 27 is pressed, if the password is correct, a calling is performed from the control section 5 via the mobile communication terminal 21 with the playing section 1 which is specified from among the game start agreement buttons 25 and 27 and a plurality of provided playing sections. In other words, when the playing section 1 which is to be operated through the bar code 24 is specified from among a plurality of playing sections 1, the specified playing section 1 is stored in the mobile communication terminal 21, and a calling from the control section 5 of the specified playing section 1 via the mobile communication terminal 21 is permitted, and the player can cause the radio unit to accurately operate. As shown in FIG. 3, the game credit switch 35 becomes electrically conductive, a game is output on the screen 11, the player can perform the game through the operation knob 13.

The information service center 28 performs accounting according to the number of times of games when the number corresponding to the calling is reached. A fee is charged by the provider of the telephone line network 31 in behalf of the information service center 28, a fee from which a calling fee and a procuration fee are subtracted is paid to the information service center 28. An administrator of the playing section 1 can receive a fee from which a commission is subtracted from the information service center 28. As described above, the player can easily enjoy the games and the like without using coins, a prepaid card, a credit card and the like.

The information service center 28 stores playing information, for example, newly arrived information of games, and transmits the newly arrived information according to the calling. The MPU board of the control section 5 receives, for example, the newly arrived information to output it on the screen 11 before playing. Therefore, the player can immediately know the newly arrived information of the games. The newly arrived information can be caused to be displayed on the screen 11 at any timing before or after the game start agreement button 25 or 27 is pressed.

In addition, a configuration can be employed in which the numeric keypad 20 which is the password input section is omitted so that the password will not be input. Further, in the above embodiment, a configuration has been employed in which a fee for one time of game is determined in advance and the accounting is performed according to the number of times of games, however, a configuration can be also employed in which the accounting is performed according to an addition of the using time of the playing section 1. That is, it is possible to enhance a degree of freedom for an accounting setting.

Next, an usage example of the mobile communication terminal 21 in FIG. 1 will be more explained.

Figure 5:
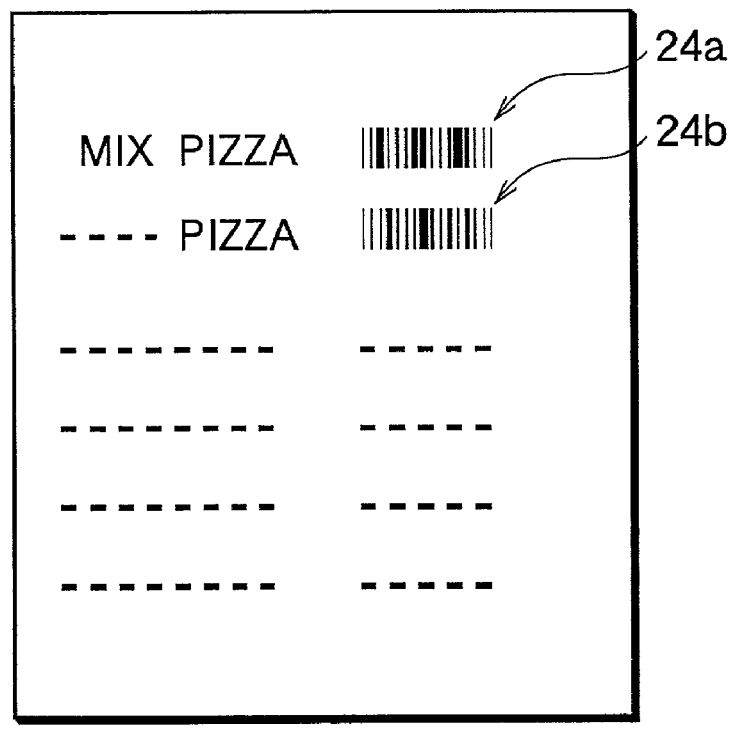
FIG. 5 is an explanatory view showing the menus of a product according to the first embodiment.

FIG. 5 shows the menus of a product in which the names of the product are identified to be displayed according to the respective bar codes 24a, 24b, . . . . The mobile communication terminal 21 comprises, for example, a fingerprint collation section, and can perform a personal identification through a fingerprint collation. Therefore, a product is selected by causing the bar code scanner of the attachment 22 of the mobile communication terminal 21 to read any of the bar codes 24a, 24b, . . . , of the menus of the product, and a fingerprint collation is performed by attaching a finger on the fingerprint collation section so that an authentication of a product order can be unified. In addition, the accounting system can employ a configuration for directly performing accounting in a shop, a configuration for utilizing the information service center 28, and further a configuration for utilizing the following Internet provider.

Figure 6:
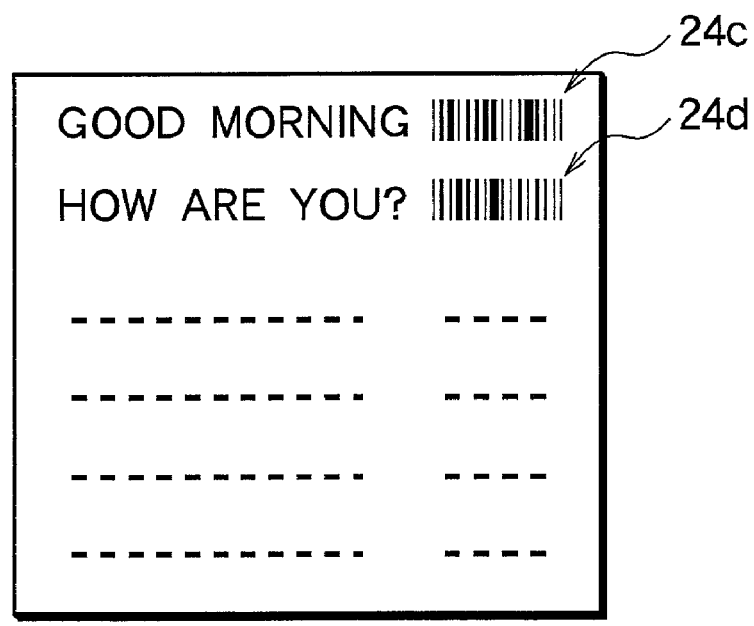
FIG. 6 is an explanatory view showing a bar code book according to the first embodiment.

FIG. 6 is a bar code book, which identifies to display a plurality words through respective bar codes 24c, 24d, . . . . The words are selected by causing the bar code scanner of the attachment 22 of the mobile communication terminal 21 to read any of the respective bar codes 24c, 24d, . . . , which enables to cause the communicating party to display the selected words through a electronic mail.

In addition, an automatic dialing through the bar code reading, an automatization of a DTMF voice response, and an automatic transmission (Web, digital) of an ID number and the like can be also performed.

Therefore, it is possible to largely simplify the key input operation by using the mobile communication terminal 21, it is possible to remarkably improve the versatility of the mobile communication terminal 21.

(Second Embodiment)

Figure 7:
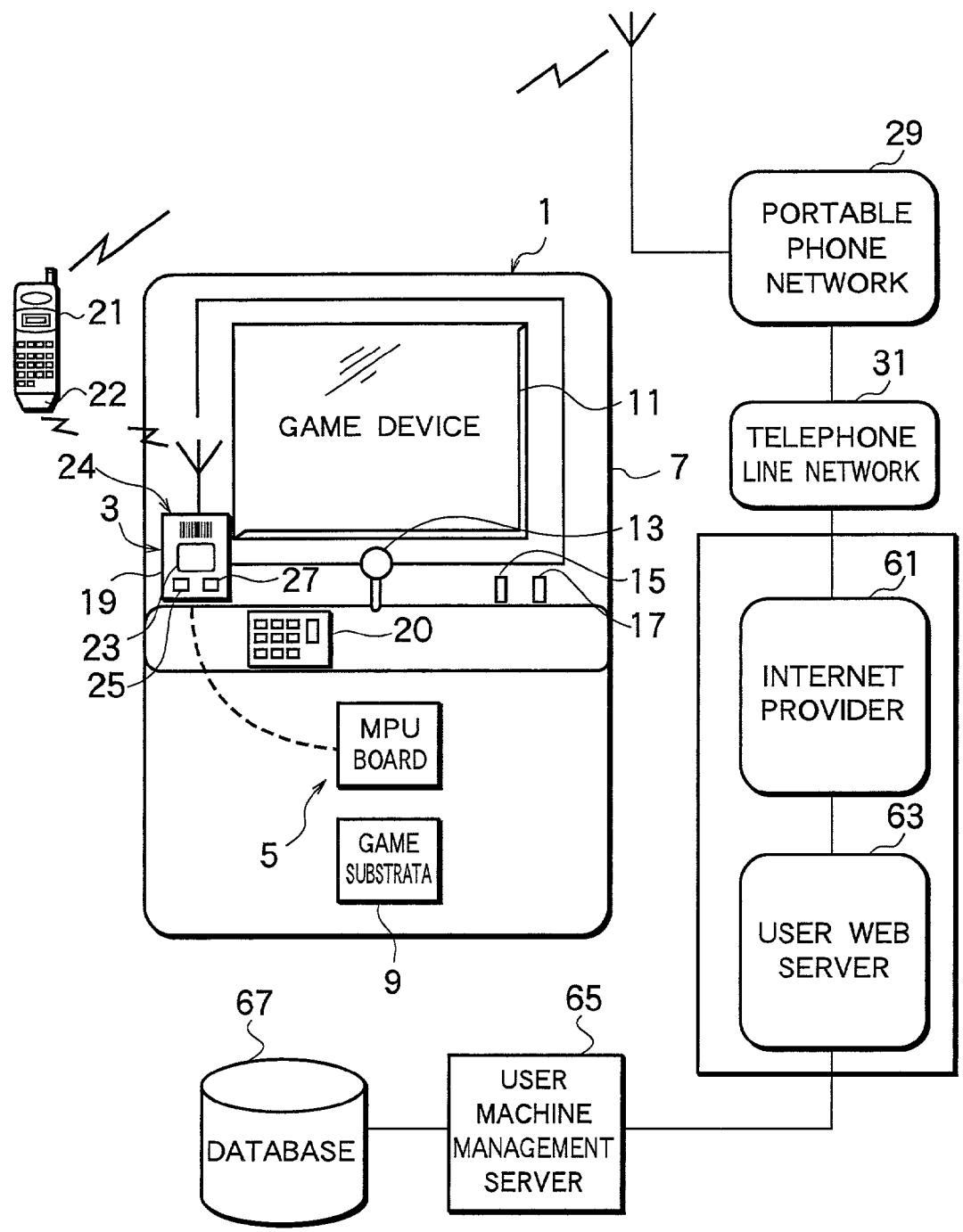
FIG. 7 is a block diagram according to a second embodiment of the present invention.

FIG. 7 shows a second embodiment according to the present invention. Constituents corresponding to those in the first embodiment are denoted with like numerals.

On the contrary to a case in which the first embodiment shown in FIG. 1 utilizes the information service center 28, the present embodiment utilizes an Internet provider 61 as shown in FIG. 7.

In other words, the telephone line network 31 is connected to the Internet provider 61, and the Internet provider 61 is connected to a user Web server 63 integrated therewith. The user Web server 63 is connected to a user machine management server 65. The user machine management server 65 comprises a database 67. The database 67 stores a fee setting table according to the respective machine numbers of a plurality of game devices which are the playing sections 1. With respect to this fee setting table, information thereon is always stored in the database 67 according to an increase or decrease of the number of game devices. Therefore, the database 67 always holds the latest information data. Further, a machine number of each game device is stored as the playing section 1 in the control section 5. Further, the mobile communication terminal 21 used in the present invention employs a type which can be connected via Internet.

When the player enjoys a game, he/she contracts with the Internet provider 61 in advance. This contract is conducted by, for example, notifying the Internet provider 61 of a credit number of a credit card and the like through an operation of the mobile communication terminal 21. Thereby, a provider ID and a password are issued from the Internet provider 61. This provider ID and the password are displayed on the display section of the mobile communication terminal 21 or the status display section 23. When the player contracts with the Internet provider 61, an input of the password and the like can be performed through the numeric keypad 20 or the mobile communication terminal 21.

In the amusement arcade, when the player transmits a radio signal from the radio unit of the attachment 22 to the radio terminal device 19 according to an operation of the mobile communication terminal 21, a serial communication is performed between the radio terminal device 19 and the control section 5, and the subscription number and the like are read. Next, the player causes the bar code scanner of the attachment 22 to read the bar code 24, and inputs the issued password from the mobile communication terminal 21. A calling is performed through the input of this password, and the machine number is read out from the control section 5 corresponding to the playing section 1 which has been specified by reading the bar code to be transmitted to the portable telephone network 29 via the mobile communication terminal 21.

The transmitted machine number is transmitted to the telephone line network 31, the Internet provider 61, the user Web server 63, and the user machine management server 65. The user machine management server 65 reads out the fee setting table according to the machine number through the database 67. The fee setting table read by the user machine management server 65 is transmitted as accounting information to the Internet provider 61 via the user Web server 63.

When this transmission is conducted, the Internet provider 61 transmits an approval signal to the mobile communication terminal 21 via the telephone line network 31 and the portable telephone network 29. This approval signal is input into the control section 5 via the radio terminal device 19. When the player presses the game start agreement button 25 or 27, a signal according to the number of times of games through the game start agreement button 25 or 27 is transmitted to the Internet provider 61, and a ticket on the fee setting table is issued. Similarly to FIG. 3, the game credit switch 35 becomes electrically conductive, a game is output on the screen 11, and the game can be played through the operation knob 13. Also in the present embodiment, a configuration can be employed in which the game start agreement buttons 25 and 27 are replaced with the identification sings such as bar codes, which are caused to be read by the scanner to recognize the number of times of games and the like.

The Internet provider 61 functions as an accounting center, and performs accounting according to the ticket issued on the fee setting table. The fee is charged by, for example, sending the bill to the player from the Internet provider 61, and a fee from which a procuration fee and the like are subtracted is paid to the machine management user of the playing section 1. Therefore, the player can easily enjoy the games without coins, and it is possible to remarkably enhance the versatility of the mobile communication terminal 21.

Also in the present embodiment, a configuration has been employed in which a fee for one time of game is determined and accounting is performed according to the number of times of games, however, a configuration can be employed in which accounting is performed according to the using time of the playing section 1. Further, also in the present embodiment, newly arrived information can be transmitted according to an input of the password.

(Third Embodiment)

Figure 8:
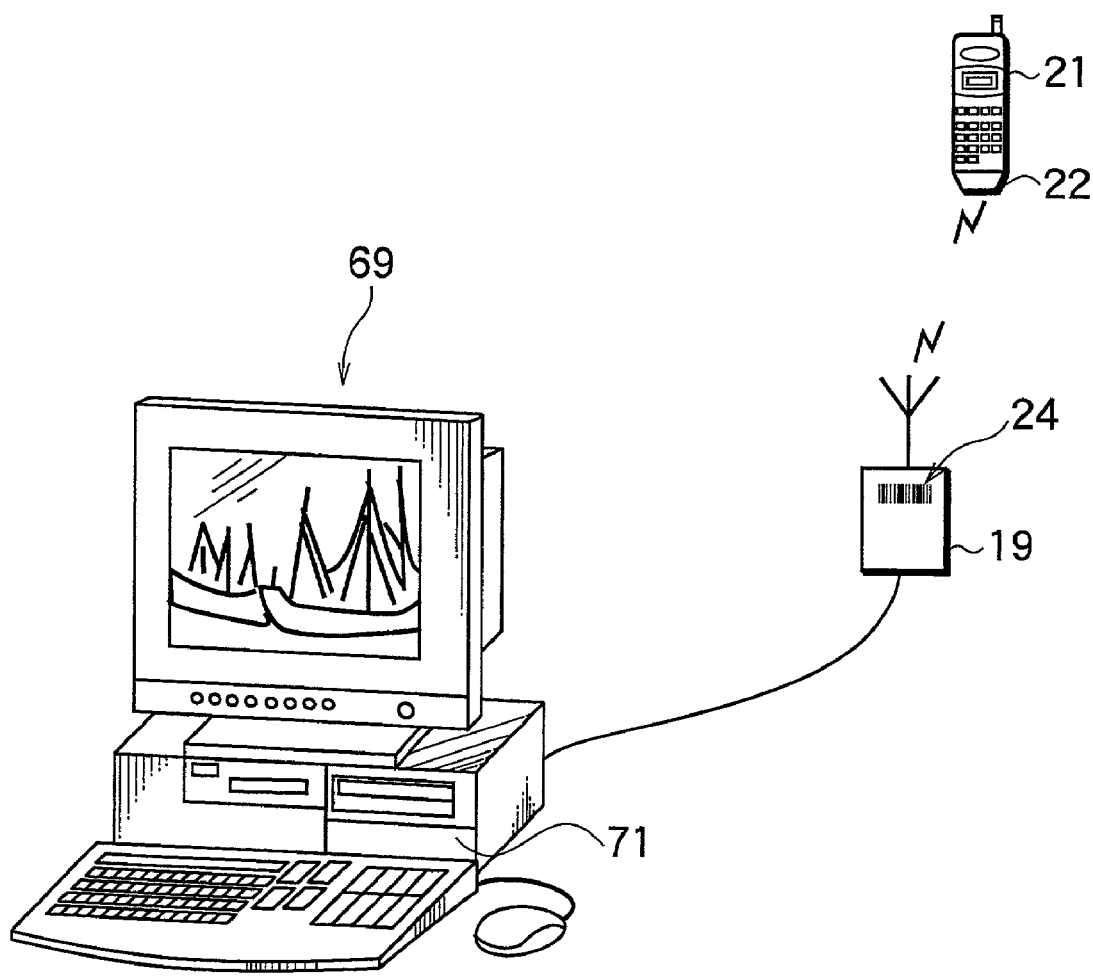
FIG. 8 is a perspective view of a desktop personal computer (PC) according to a third embodiment of the present invention.
Figure 9:
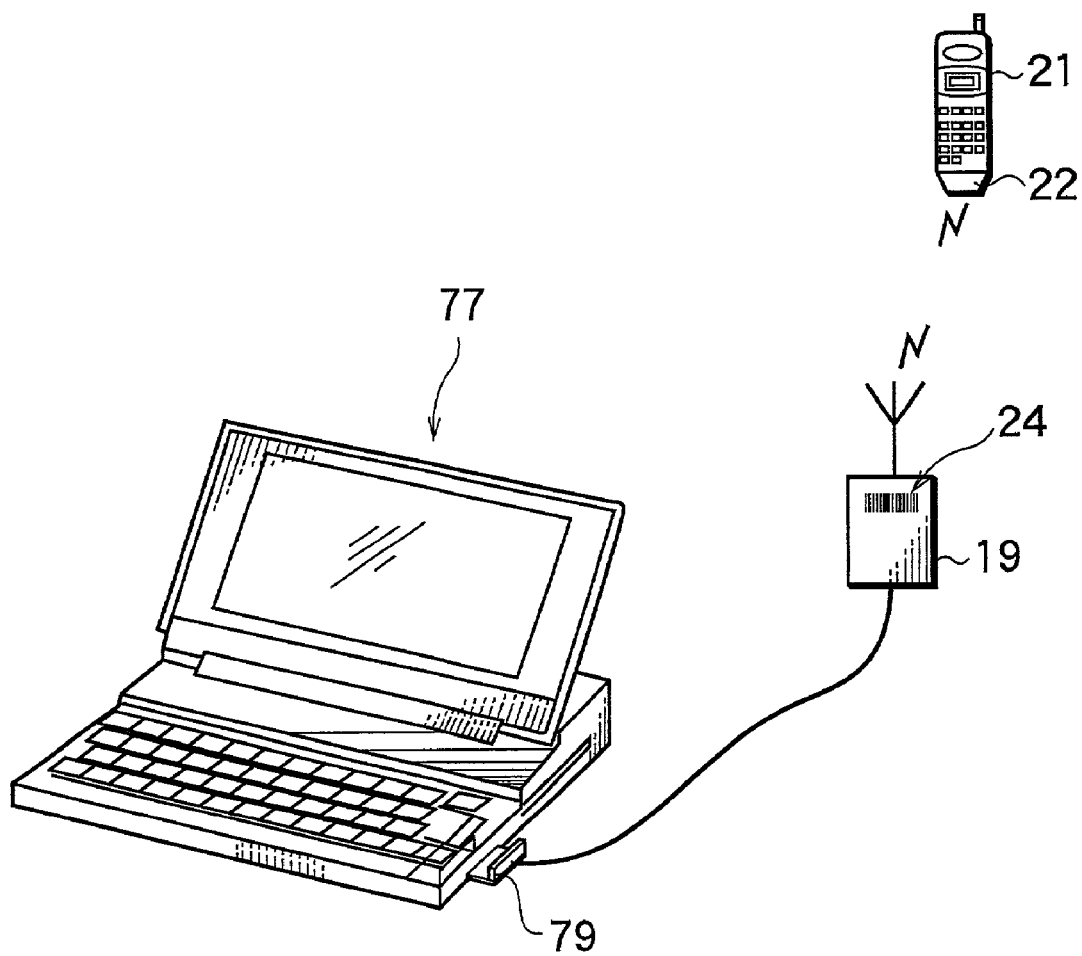
FIG. 9 is a perspective view of a notebook model personal computer (PC) according to the third embodiment of the present invention.

FIGS. 8 and 9 show a third embodiment according to the present invention. Constituents corresponding to those in the first embodiment are denoted with like numerals. In the present embodiment, a configuration is employed in which, when any of a plurality of personal computers provided in the amusement arcade is used to operate the Internet information such as a game software, a word processor software, or a spreadsheet program, accounting is performed according to the operating time thereof so that the versatility of the mobile communication terminal can be enhanced.

In other words, FIG. 8 shows a case in which the playing section is applied to a desktop model personal computer (desktop PC) 69 as an information handset. The desktop PC 69 is provided with a serial communication port 71, and the radio terminal device 19 is connected to the serial communication port 71.

Further, FIG. 9 shows a case in which the playing section is applied to a notebook model personal computer (notebook PC) 77 as an information handset. The notebook PC 77 has a PCMCIA card 79 which has be inserted into the card slot that is provided with thereof, and the radio terminal device 19 is connected to the PCMCIA card 79.

In the case of FIGS. 8 and 9, the games stored in the game device are not played as in the above embodiments, Internet information such as a game software, a word processor software, a spreadsheet program or the like is operated on the desktop PC 69 or the notebook PC 77. In the case of a game, a game match or the like can be conducted on the Internet. Accounting is performed according to the using time, for example, a fee setting of 1-dollar for one hour, and the fee is charged.

When the user operates the desktop PC 69 or the notebook PC 77, he/she contracts with an Internet provider in advance as in the above embodiments. This contract is performed by notifying a credit number of a credit card and the like as described above.

When the player transmits a radio signal to the radio terminal device 19 from the radio unit of the attachment 22 through an operation of the mobile communication terminal 21, a serial communication is conducted between the radio terminal device 19 and the control section 5, and the subscription number and the like are read. Next, when the player causes the bar code scanner of the attachment 22 to read the bar code 24 and inputs the password through the mobile communication terminal 21 or the keyboard of the desktop PC 69 or the notebook PC 77, a calling according to the desktop PC 69 or the notebook PC 77 which has been specified with the subscription number read from the mobile communication terminal 21 is performed. Through this calling, a connection is conducted to the accounting center of the Internet provider, and an approval signal and a purpose program on the Internet are transmitted. Thereby, the user of the desktop PC 69 or the notebook PC 77 can conduct a game software, a word processor software, a spreadsheet program or the like through the operation thereof.

When the desktop PC 69 or the notebook PC 77 is being operated, the call of the mobile communication terminal 21 is disconnected once. When the program operation of the desktop PC 69 or the notebook PC 77 is terminated, a call is performed again, time calculation is performed in the accounting center of the Internet provider and a predetermined accounting is performed. The charge of the fee is conducted by sending the bill to the user of the desktop PC 69 or the notebook PC 77 from the Internet provider. A fee from which a procuration fee and the like are subtracted is paid to the administrator of the desktop PC 69 or the notebook PC 77. Therefore, also in the present embodiment, it is possible to easily enjoy the Internet games and the like by using the mobile communication terminal 21, and it is possible to easily and accurately charge the fee even when the desktop PC 69 and the notebook PC 77 are provided in plural.

In the above embodiments, a configuration has been employed in which accounting is performed according to the using time addition of the information handset, however, a configuration can be employed in which the fee is determined for each of game software, word processor software, and spreadsheet program so that accounting is performed according to the number of using times of the information.

In the above embodiments, an input of the password is performed as an authentication method of the personal identification, however, a configuration may be employed in which a fingerprint collation unit is provided on the mobile communication terminal 21 so that the authentication of personal identification can be performed by the fingerprint authentication.

What is claimed is:

1. A management apparatus comprising:
   a mobile communication terminal comprising a radio unit for enabling to wirelessly output a signal including personal information and a reading unit for enabling to read an identification sign;
   an operation object, separate from said mobile communication terminal, capable of being operated on the basis of the personal information received from the mobile communications terminal;
   an input section which is provided on the operation object to input the personal information from the mobile communication terminal with a radio signal;
   an externally readable unique identification sign which is provided on the operation object to identify the operation object; and
   a control section disposed in said operation object, said control section for calling an accounting center via said radio unit of the mobile communication terminal and for enabling a user to operate the operation object on the basis of the calling;
   said call being on the basis of:
      a radio signal input of the personal information from the radio unit of the mobile communication terminal; and
      a reading of the identification sign from an identification unit disposed on said operation object;
   wherein the accounting center performs accounting according to an operation of the operation object.

2. A management apparatus according to claim 1, comprising a password input section for inputting a password as the personal information;
   wherein the control section calls the information service center when the input password corresponds to the personal information.

3. A management apparatus comprising:
   a mobile communication terminal comprising a radio unit for enabling to wirelessly output a signal including personal information, and a reading unit for enabling to read an identification sign;
   a playing station, separate from the mobile communication terminal, capable of enabling a user to play on said playing station a game stored on said playing station on the basis of the personal information received from the mobile communications terminal;
   an input section which is provided on the playing station to input the personal information from the mobile communication terminal with a radio signal;
   an externally readable unique identification sign which is provided on the playing station to identify the playing station; and
   a control section disposed in said play station, said control section for calling an information service center via said radio unit of the mobile communication terminal and for enabling the user to play with the playing station on the basis of the calling;
   said calling being on the basis of:
      a radio signal input of the personal information from the radio unit of the mobile communication terminal; and
      a reading of the identification sign from an identification unit disposed on said play station;
   wherein the information service center performs accounting according to a playing of the playing station.

4. A management apparatus according to claim 3, wherein the information service center stores newly arrived information of playing information therein and transmits the newly arrived information according to the calling; and
   the control section receives the newly arrived information to output it to the playing station.

5. A management apparatus according to claim 4, comprising a password input section for inputting a password as the personal information;
   wherein the control section calls the information service center when the input password corresponds to the personal information.

6. A management apparatus according to claim 3, comprising a password input section for inputting a password as the personal information;
   wherein the control section calls the information service center when the input password corresponds to the personal information.

* * * * *